Patented Mar. 7, 1933

1,900,864

UNITED STATES PATENT OFFICE

RUSSELL E. LOWE, OF NEW YORK, NORMAN B. BROWN, OF ST. ALBANS, AND WILLIAM BJORKSTEDT, OF JAMAICA, NEW YORK, ASSIGNORS TO DOHERTY RESEARCH COMPANY, OF NEW YORK, N. Y., A CORPORATION OF DELAWARE

REFRACTORY POROUS DIAPHRAGM

No Drawing. Application filed March 7, 1927, Serial No. 173,599. Renewed December 31, 1931.

This invention relates to the manufacture of refractory bodies and has for its principal object to provide a method of making porous refractory diaphragms composed essentially of zircon. More particularly the invention is concerned with the manufacture of zircon diaphragms which shall be sufficiently porous to adequately pass gas or oil for utilization in accordance with surface combustion principles and which shall be sufficiently strong for their intended purpose.

In accordance with the present invention, a zircon grog of graded size is prepared and this grog bonded in the manner hereinafter described. The grog consists of particles of zircon suitably bonded together, preferably by means of an iron compound. The particles of grog are preferably of such size that they will pass through a 20-mesh screen but will not pass through a 40-mesh screen, the screen size being based on the Tyler standard.

The preferred method of bonding the grog aggregate is as follows: A small quantity of milled grain zircon, hereinafter termed fines, is mixed with the grog. To this aggregate is added a relatively small amount of phosphoric anhydride added as phosphoric acid after which the mass is ready for molding and firing. The proportion of fines to grog plays a very important part in the bonding of the grog and in determining the final strength and porosity of the diaphragms. If the fines constitute substantially less than 5% by weight of the grog-fines aggregate the finished product does not possess sufficient strength for practical purposes whereas if they constitute more than 20% the product is not sufficiently porous to serve as diaphragms in accordance with surface combustion principles unless excessive mixture pressures be employed. The practical limits of fines have been found to be between 5% and 12% of the weight of the grog-fines aggregate where the finished product is to be used for surface combustion diaphragms. If the finished product is to be used for purposes where porosity is of secondary importance, there is no practical advantage in having the fines constitute more than 20% of the grog-fines aggregate because beyond this percentage no appreciable additional strength in the finished product is obtained. A grog-fines aggregate containing 12% by weight of fines not only produces a porous refractory but also produces a refractory which is sufficiently strong for general application and therefore the practical limit of fines may be considered as 12% of the grog-fines aggregate.

As previously stated, phosphoric anhydride ($P_2O_5$) as phosphoric acid is added to the grog-fines aggregate prior to firing. The amount of $P_2O_5$ is such as to constitute approximately 6% of the weight of said aggregate, the minimum limit being about 4%. No particular advantage as regards bonding results from materially increasing the $P_2O_5$ content beyond 6%. If it is desired that the mixture shall have the property of "air setting" a slight excess of concentrated ammonium hydroxide may be added in order to convert the phosphoric acid into ammonium acid phosphate. The ammoniated mixture sets on exposure to air to a mass of sufficient strength so that the moulded object will withstand the handling incidental to firing.

The initial stage of firing, i. e. from room temperature to 500° F. should be done at a moderate temperature increase to permit gradual escape of volatiles from the moulded mass. At a temperature ranging between 1200° F. to 1500° F. the body will have developed ample strength for usual requirements but it is best to continue firing to 1800° F. to complete volume changes. Firing beyond 1800° F. has little effect upon the strength or dimensions of the body.

As previously indicated the grog consists of bonded zircon particles, the bonding agent preferably consisting of iron compound. The preferred method of making the grog may be briefly indicated. The zircon particles are first wet with a ferric chloride solution and the wet mixture treated with a soluble hydroxide, preferably ammonium hydroxide in order to convert the ferric chloride into iron hydrate. The mass is then shaped and fired. The proportionate amount of iron hydroxide should preferably be less than one per cent by weight in order to keep the sintering point of the refractory close to the fusion point. This particular method of bonding zircon particles forms the subject of a separate application by one of the present applicants, namely, Russell E. Lowe, patented Dec. 11, 1928, No. 1,694,924.

What is claimed is:

1. A method of bonding particles of already bonded zircon grains comprising bonding the particles with a bonding agent including zircon fines and an ammonium compound of phosphorous.

2. A method of making zircon refractories comprising mixing zircon grog with zircon fines, the grog consisting of particles passing through screens not substantially larger than 20-mesh and not substantially smaller than 40-mesh, said fines constituting between 5% to 20% by weight of the grog-fines aggregate, adding $P_2O_5$ to said aggregate and firing the mass, the $P_2O_5$ by weight constituting not substantially less than 4% of the weight of said aggregate.

3. A method of making zircon refractories comprising mixing zircon grog with zircon fines, the grog consisting of particles passing through screens not substantially larger than 20-mesh and not substantially smaller than 40-mesh, said fines constituting between 5% to 12% by weight of the grog-fines aggregate, adding $P_2O_5$ to said aggregate and firing the mass, the $P_2O_5$ by weight constituting between 4% to 6% of the weight of said aggregate.

4. A method of making zircon refractories comprising mixing zircon grog with zircon fines, the grog consisting of particles passing through screens not substantially larger than 20-mesh and not substantially smaller than 40-mesh, said fines constituting approximately 5% by weight of the grog-fines aggregate, adding $P_2O_5$ to said aggregate and firing the mass, the $P_2O_5$ constituting approximately 6% by weight of said aggregate.

5. A method of making zircon refractories comprising mixing zircon grog with zircon fines, the grog consisting of particles passing through screens not substantially larger than 20-mesh and not substantially smaller than 40-mesh, said fines constituting between 5% to 20% by weight of the grog fines aggregate, adding phosphoric acid to said aggregate in such amount that calculating the acid as $P_2O_5$ the latter will constitute between 4% to 6% of the weight of the aggregate, adding sufficient ammonium hydroxide to convert the acid into ammonium acid phosphate, and firing the mixture.

6. A method of making zircon refractories comprising mixing zircon grog with zircon fines, the grog consisting of particles passing through screens not substantially larger than 20-mesh and not substantially smaller than 40-mesh, said fines constituting between 5% to 12% by weight of the grog-fines aggregate, adding phosphoric acid to said aggregate in such amount that calculating the acid as $P_2O_5$ the latter will constitute between 4% to 6% of the weight of the aggregate, adding sufficient ammonium hydroxide to convert the acid into ammonium acid phosphate, and firing the mixture.

7. A method of making zircon refractories comprising mixing zircon grog with zircon fines, the grog consisting of particles passing through screens not substantially larger than 20-mesh and not substantially smaller than 40-mesh, said fines constituting approximately 5% by weight of the grog-fines aggregate, adding phosphoric acid to said aggregate in such amount that calculating the acid as $P_2O_5$ the latter will constitute between 4% to 6% of the weight of the aggregate, adding sufficient ammonium hydroxide to convert the acid into ammonium acid phosphate, and firing the mixture.

8. In a composition of matter a mixture of zircon, sand and a phosphate of ammonia.

9. In a composition of matter adapted for use for refractory purposes, a mixture comprising ten parts of zircon sand and less than one part of phosphate of ammonia.

10. A batch for making refractories comprising zircon grains and a phosphate of ammonia.

11. A method of making refractories comprising incorporating a phosphate of ammonia and water with zircon grains, shaping, and firing.

In testimony whereof the parties herein affix their signatures.

RUSSELL E. LOWE.
NORMAN B. BROWN.
WILLIAM BJORKSTEDT.